United States Patent
Biswas

(10) Patent No.: US 9,794,196 B2
(45) Date of Patent: Oct. 17, 2017

(54) APPLICATION-CONTROLLED NETWORK PACKET CLASSIFICATION

(71) Applicant: NetApp, Inc., Sunnyvale, CA (US)

(72) Inventor: Anumita Biswas, Santa Clara, CA (US)

(73) Assignee: NETAPP, INC., Sunnyvale, CA (US)

( * ) Notice: Subject to any disclaimer, the term of this patent is extended or adjusted under 35 U.S.C. 154(b) by 326 days.

(21) Appl. No.: 14/487,719

(22) Filed: Sep. 16, 2014

(65) Prior Publication Data

US 2015/0003467 A1    Jan. 1, 2015

Related U.S. Application Data

(63) Continuation of application No. 11/936,141, filed on Nov. 7, 2007, now Pat. No. 8,838,817.

(51) Int. Cl.
| | |
|---|---|
| *H04L 12/861* | (2013.01) |
| *H04L 12/721* | (2013.01) |
| *H04L 12/815* | (2013.01) |
| *H04L 12/823* | (2013.01) |
| *H04L 12/859* | (2013.01) |

(52) U.S. Cl.
CPC ............ *H04L 49/90* (2013.01); *H04L 45/38* (2013.01); *H04L 47/22* (2013.01); *H04L 47/2475* (2013.01); *H04L 47/32* (2013.01)

(58) Field of Classification Search
CPC ..... H04L 47/32; H04L 47/2475; H04L 49/90; H04L 47/22; H04L 45/38
See application file for complete search history.

(56) References Cited

U.S. PATENT DOCUMENTS

| | | |
|---|---|---|
| 4,847,755 A | 7/1989 | Morrison et al. |
| 5,021,945 A | 6/1991 | Morrison et al. |
| 5,410,675 A | 4/1995 | Shreve et al. |
| 5,535,338 A | 7/1996 | Krause et al. |
| 5,796,939 A | 8/1998 | Berc et al. |
| 6,078,564 A | 6/2000 | Lakshman et al. |
| 6,338,078 B1 | 1/2002 | Chang et al. |
| 6,363,477 B1 | 3/2002 | Fletcher et al. |
| 6,480,507 B1 | 11/2002 | Mercer et al. |
| 6,769,121 B1 * | 7/2004 | Koyama ............... G06F 9/4862 709/201 |
| 6,820,127 B2 | 11/2004 | Banerjee |

(Continued)

OTHER PUBLICATIONS

Biswas, Anumita, "Combined Network and Application Processing in a Multiprocessing Environment," U.S. Appl. No. 12/045,991, filed Mar. 11, 2008.

(Continued)

*Primary Examiner* — Philip Chea
*Assistant Examiner* — Robert B McAdams
(74) *Attorney, Agent, or Firm* — Nixon Peabody LLP; Khaled Shami

(57) ABSTRACT

Embodiments of the present invention provide a system, method, and computer program product that enables applications transferring data packets over a network to a multiprocessing system to choose how the data packets are going to be processed by, e.g., allowing the applications to pre-assign connections to a particular network thread and migrate a connection from one network thread to another network thread without putting the connection into an inconsistent state.

12 Claims, 12 Drawing Sheets

(56) References Cited

U.S. PATENT DOCUMENTS

| | | | |
|---|---|---|---|
| 6,904,040 B2* | 6/2005 | Salapura | H04L 47/10 370/395.32 |
| 6,920,501 B2 | 7/2005 | Chu et al. | |
| 6,922,557 B2 | 7/2005 | Fantaske | |
| 6,931,449 B2* | 8/2005 | Schmidt | G06F 9/4862 709/220 |
| 6,981,140 B1 | 12/2005 | Choo | |
| 6,990,662 B2 | 1/2006 | Messer et al. | |
| 7,020,713 B1 | 3/2006 | Shah et al. | |
| 7,065,568 B2 | 6/2006 | Bracewell et al. | |
| 7,127,717 B2 | 10/2006 | Kawashimo et al. | |
| 7,287,090 B1 | 10/2007 | Berg | |
| 7,287,258 B1 | 10/2007 | Salmon et al. | |
| 7,290,039 B1 | 10/2007 | Lisitsa et al. | |
| 7,349,953 B2 | 3/2008 | Lisitsa et al. | |
| 7,353,266 B2 | 4/2008 | Bracewell et al. | |
| 7,373,646 B1 | 5/2008 | Smith | |
| 7,443,836 B2 | 10/2008 | Hooper et al. | |
| 7,500,239 B2 | 3/2009 | Meng | |
| 7,502,870 B1 | 3/2009 | Chu | |
| 7,529,823 B2 | 5/2009 | Trufinescu et al. | |
| 7,581,163 B1 | 8/2009 | Zhou et al. | |
| 7,630,402 B2 | 12/2009 | Un et al. | |
| 7,664,823 B1* | 2/2010 | Wakerly | G06F 15/163 709/211 |
| 7,664,938 B1 | 2/2010 | Tripathi et al. | |
| 7,899,044 B2 | 3/2011 | Rusmisel et al. | |
| 7,953,878 B1 | 5/2011 | Trimble | |
| 8,135,033 B2 | 3/2012 | Garcia et al. | |
| 2002/0156932 A1* | 10/2002 | Schneiderman | G06F 9/4862 719/317 |
| 2002/0194338 A1 | 12/2002 | Elving | |
| 2003/0037607 A1 | 2/2003 | Minich et al. | |
| 2003/0069920 A1* | 4/2003 | Melvin | G06F 9/30101 718/108 |
| 2003/0081615 A1 | 5/2003 | Kohn et al. | |
| 2003/0140088 A1 | 7/2003 | Robinson et al. | |
| 2003/0140124 A1* | 7/2003 | Burns | H04L 45/00 709/220 |
| 2004/0030745 A1 | 2/2004 | Boucher et al. | |
| 2004/0148376 A1 | 7/2004 | Rangan et al. | |
| 2004/0193678 A1 | 9/2004 | Trufinescu et al. | |
| 2004/0205754 A1 | 10/2004 | Gazda et al. | |
| 2004/0216125 A1 | 10/2004 | Gazda et al. | |
| 2004/0246956 A1 | 12/2004 | Meng | |
| 2005/0039159 A1* | 2/2005 | Pan | G06F 9/4862 717/100 |
| 2005/0060365 A1 | 3/2005 | Robinson et al. | |
| 2005/0138091 A1 | 6/2005 | Bono | |
| 2005/0154783 A1 | 7/2005 | Lisitsa et al. | |
| 2005/0226235 A1 | 10/2005 | Kumar et al. | |
| 2005/0243734 A1 | 11/2005 | Nemirovsky et al. | |
| 2006/0013222 A1 | 1/2006 | Rangan et al. | |
| 2006/0013253 A1 | 1/2006 | Hufferd | |
| 2006/0059287 A1 | 3/2006 | Rivard et al. | |
| 2006/0218556 A1* | 9/2006 | Nemirovsky | G06F 9/3851 718/104 |
| 2006/0242532 A1 | 10/2006 | Joglekar et al. | |
| 2006/0271734 A1 | 11/2006 | Strange et al. | |
| 2007/0019636 A1 | 1/2007 | Lau et al. | |
| 2007/0026887 A1 | 2/2007 | Voyer et al. | |
| 2007/0070975 A1 | 3/2007 | Otani et al. | |
| 2007/0078819 A1 | 4/2007 | Zayas et al. | |
| 2007/0162631 A1 | 7/2007 | Balakrishnan et al. | |
| 2007/0168693 A1 | 7/2007 | Pittman | |
| 2007/0174850 A1 | 7/2007 | El Zur | |
| 2007/0208821 A1 | 9/2007 | Pittman | |
| 2007/0291779 A1 | 12/2007 | Wunderlich | |
| 2008/0082966 A1 | 4/2008 | Dorn et al. | |
| 2008/0114814 A1 | 5/2008 | Vellanki et al. | |
| 2008/0134196 A1 | 6/2008 | Madriles et al. | |
| 2008/0163215 A1 | 7/2008 | Jiang et al. | |
| 2008/0184233 A1 | 7/2008 | Norton et al. | |
| 2008/0244118 A1 | 10/2008 | Accapadi et al. | |
| 2008/0301299 A1 | 12/2008 | Cahill et al. | |
| 2009/0006502 A1 | 1/2009 | Leung et al. | |
| 2009/0125907 A1 | 5/2009 | Wen et al. | |
| 2011/0225391 A1* | 9/2011 | Burroughs | G06F 9/3851 711/216 |
| 2012/0158729 A1* | 6/2012 | Mital | G06F 15/167 707/738 |

OTHER PUBLICATIONS

Bjorkman, Mats et al, "Performance Modeling of Multiprocessor Implementations of Protocols," IEEE/ACM Transactions on Networking, vol. 6, No. 3, Jun. 1998.

Ito, Robert Mabo et al., "A Multiprocessor Approach for Meeting the Processing Requirements for OSI," IEEE Journal on Selected Areas in Communications, vol. 11, No. 2, Feb. 1993.

Kaiserwerth, Matthias, "The Parallel Protocol Engine," IEEE/ACM Transactions on Networking, vol. 1, No. 6, Dec. 1993.

Leue, Stephan et al., "On Parallelizing and Optimizing the Implementation of Communication Protocols," IEEE/ACM Transactions on Networking, vol. 4, No. 1, Feb. 1996.

Lin, Xiaojun; Shroff, Ness B.; Srikant, R., "A Tutorial on Cross-Layer Optimization in Wireless Networks", © 2006, IEEE, IEEE Journal on Selected Areas in Communications, vol. 24, No. 8, pp. 1452-1463.

Millerg, Mikael; Nillson, Erland; Thid Rikard; Kumar, Shashi; Jantsch, Axel, "The Nostrum Backbone—a Communication Protocol Stack for Networks on Chip", © 2004, IEEE, Proceedings of the 17th International Conference on VLSI Design.

Nahum, Erich M et al., "Performance Issues in Parallelized Network Protocols," Proceedings of the First Symposium on Operating Systems Design and Implementation, Usenix Association, Nov. 1994.

Salehi, James D. et al., "The Effectiveness of Affinity-Based Scheduling in Multiprocessor Network Protocol Processing (Extended Version)," IEEE/ACM Transactions on Networking, vol. 4, No. 4, Aug. 1996.

Schmidt, Douglas C. et al., "Measuring the Performance of Parallel Message-based Process Architectures," INFOCOM '95: Proceedings of the Fourteenth Annual Joint Conference of the IEEE Computer and Communication Societies (vol. 2), Apr. 1995.

TechTarget, "OSI (Open System Interconection)", © Oct. 10, 2006. <http://searchnetworking.techtarget.com/definition/OSI>.

Wikipedia, "OSI model", © Dec. 23, 2004 <http://en.wikipedia.org/w/index.php?title=OSI_model&oldid=9028529>.

Yates, David J. et al., "Networking Support for Large Scale Multiprocessor Servers," Proceedings of the 1996 ACM Sigmetrics international conference on Measurement and modeling of computer systems, May 1996.

* cited by examiner (PRE-ASSIGNMENT OF CONNECTIONS)

(SOURCE_PORT_MAP)

US 9,794,196 B2

APPLICATION-CONTROLLED NETWORK PACKET CLASSIFICATION

RELATED APPLICATIONS

The present application is a continuation of U.S. patent application Ser. No. 11/936,141, entitled "APPLICATION-CONTROLLED NETWORK PACKET CLASSIFICATION", filed on Nov. 7, 2007 by Anumita Biswas, the contents of which are incorporated by reference herein in their entirety, which is also related to U.S. patent application Ser. No. 11/869,365, entitled "MULTI-THREADED INTERNET SMALL COMPUTER SYSTEM INTERFACE (ISCSI) SOCKET LAYER," by Carlisle Trimble, filed Oct. 9, 2007, now issued as U.S. Pat. No. 7,953,878 on May 31, 2011, the disclosure of which is incorporated by reference herein.

FIELD OF THE INVENTION

The present invention relates to transmission of data packets across a network, and more particularly, to parallelizing processing of data packets.

BACKGROUND

Applications on network devices (such as computer systems connected over a network) can create connections among each other over which they can exchange streams of data in the form of data packets. A data packet is a unit of information transmitted as a discrete entity between devices over the network. To achieve high-speed and high-performance of data packet processing, it is common to parallelize the processing so that network devices can execute more than one thread (e.g., a separate stream of packet execution that takes place simultaneously with and independently from other processing) simultaneously on a multi-processing platform. Multi-processing is useful when a single task takes a long time to complete and processing packets serially (e.g., one at a time) would slow down the overall packet throughput. In a multiprocessing system, packets can be queued to network contexts (e.g., data structures that queue data packets that belong to the same network connection) for further processing based on some kind of algorithm. As a result, data packets that belong to a single connection (such as, for example, a Transmission Control Protocol (TCP) connection) are queued to a single network context, and thus are processed by a single network thread. Data packets that belong to different network connections may be processed by different network threads.

Conventionally, after connection is established between two network devices, data packets for a particular connection are received by network drivers at a destination network device. The network drivers execute driver threads to queue the received data packets and call a packet classifier. The packet classifier, in turn, is responsible for maintaining a pool of network threads and their associated network contexts. The packet classifier receives a data packet, calculates a hash based on a 3-tuple (source IP address, source port, and destination port) indicated in the packet, and uses the calculated value to identify a network context to which the data packets arriving on the connection has to be queued. The following hash function can be used:

$$y=hash1(x);$$

wherein 'x' is a combination of a source IP address, source port, and destination port indicated in the packet; 'y' represents a hash number, which then becomes an input to another function, which maps the hash to a network context number 'y1' as follows:

$$y1=map\_hash\_q(y);$$

wherein "q" represents a network context queue.

A network thread picks up the packet and performs TCP processing. A TCP module of the destination network device receives the data packet and the network context and determines TCP connection to which the data packet belongs. It does so by calculating a hash value based on a 3-tuple (using the same hash function that the packet classifier was using). The TCP module uses the hash to index into a TCP hash table (such as TCP table 500 shown in FIG. 5) to obtain a protocol control block (PCB) corresponding to the connection (each PCB stores information related to one TCP connection, such as establishing a connection, managing data transmission via data packets, managing data receipt, and termination of the connection). A TCP table represents an array, with each index in the array being a linked list of PCBs. An index is also referred to herein as a "hash bucket."

Thus, conventionally, the packet classifier and the TCP module share the same hash function to perform its processing. The rational for doing this is as follows. Since in multiprocessing systems, all network threads access the TCP hash table at the same time, the TCP hash table has to be protected from access conflicts. The TCP hash table can be protected by ensuring that no two threads access the same data structure at the same time. This can be done by locking the data structure or by ensuring that no two threads can access the same PCB at the same time. Locking, however, is a very cumbersome mechanism to implement. Thus, one feasible alternative to locking is to ensure that a particular hash index 'y' is accessed only by a particular network thread. This can be done by segmenting a single TCP hash table into different network context queues by using a single hash function y=hash(x) (as described above) as follows:

$$y=hash(x), y1=map\_hash\_q(y);$$

where 'x' is a logical summation of a destination port, source port and source address of a particular TCP connection; 'y' is the hash index to the TCP hash table; 'y1' is an identifier of a network context queue for a particular network thread. Since 'y' is always the same for a given x, a particular TCP connection always gets mapped to the same network context queue y1.

Since a hash index 'y' is uniquely mapped to a network context 'y1', all the connections in hash bucket 'y' are assigned to a network context 'y1.' As a result, a network thread processing connections in a different network context will not be able to access data related to connections queued to a network context 'y1.' This ensured that no locks are needed to access TCP hash table in a multiprocessing system.

However, using the same hash function by the TCP module and by the packet classifier limits the ability of applications to decide how they want their data packets to be processed. Since in prior art implementations the load balancing of connections was achieved by using the default hash algorithm for all TCP connections in general and did not differentiate between TCP connections of one application and another application, connections of a particular application were not load balanced. Furthermore, an application may want data packets that belong to the same session, but to different connections, to be processed by the same network thread. Currently, applications do not have this capability, and data packets that belong to the same session, but to different connections, might be processed by different network threads and then reassembled after processing is completed. This, in turn, slows down performance of the multiprocessing device.

Accordingly, what is needed is a mechanism that provides flexibility to applications to distribute connections in a multiprocessing system.

SUMMARY OF THE INVENTION

Embodiments of the present invention provide a system, method, and computer program product that enables applications transferring data packets over a network to a multiprocessing system to choose how the data packets are going to be processed by, e.g., allowing the applications to preassign processing of data packets to a particular network thread and to move the processing of the data packets to another network thread. This can advantageously increase throughput of the multi-processing system. Furthermore, rather than having multiple network threads accessing a single TCP data structure (a hash table), each network thread is associated with its own TCP table that stores information about connections assigned to the network thread for processing. Since each thread can only access its own TCP data structure, the TCP module can process network threads using an algorithm different from the one used by a packet classifier to distribute connections to different network contexts. By having each network thread associated with its own TCP data structure, the present invention eliminates the need to segment the TCP data structure or to lock the data structure to prevent multiple threads from accessing the same data structure.

Since the packet classifier (herein referred to as a "classification module" of a multiprocessing system) and network threads are no longer required to share the same hash function, according to an embodiment of the present invention, the packet classifier can use various hash algorithms (rather than a default algorithm) to distribute connections to different network contexts. Using custom hash functions enables applications to flexibly distribute connections over different network contexts (and thus their associated network threads). As a result, connections that belong to a single application are better load-balanced in a multiprocessing system.

According to another embodiment of the present invention, a mechanism is provided that enables applications to pre-assign connections to a particular network context (and thus to its associated network thread) so that data packets that belong to the same session yet to different connections are processed by the same network thread.

Furthermore, the present invention provides capability to migrate connections (and data packets that arrive on the connections). As used herein, "migrating a connection" means terminating assignment of a connection to a particular network context and assigning the connection to a different network context. Creating TCP tables for each network context (and thus for each network thread) makes migration of connections a lot easier since a PCB corresponding to a connection that is being migrated can be easily moved from a TCP table that stores information about that connection to another TCP table that stores connections for a network context where the connection is migrated. Importantly, embodiments of the present invention block processing of all data packets on the connection until the migration is completed.

Those of skill in the art would understand that although the present invention is described in the context of TCP, other protocols (such as User Datagram Protocol (UDP) and Hypertext Transfer Protocol (HTTP)) can be used for transmitting data over a network.

Other aspects of the invention will become apparent from the following detailed description taken in conjunction with the accompanying drawings, which illustrate the principles of the invention by way of example.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Network and Storage Server Environment

Figure 1A:
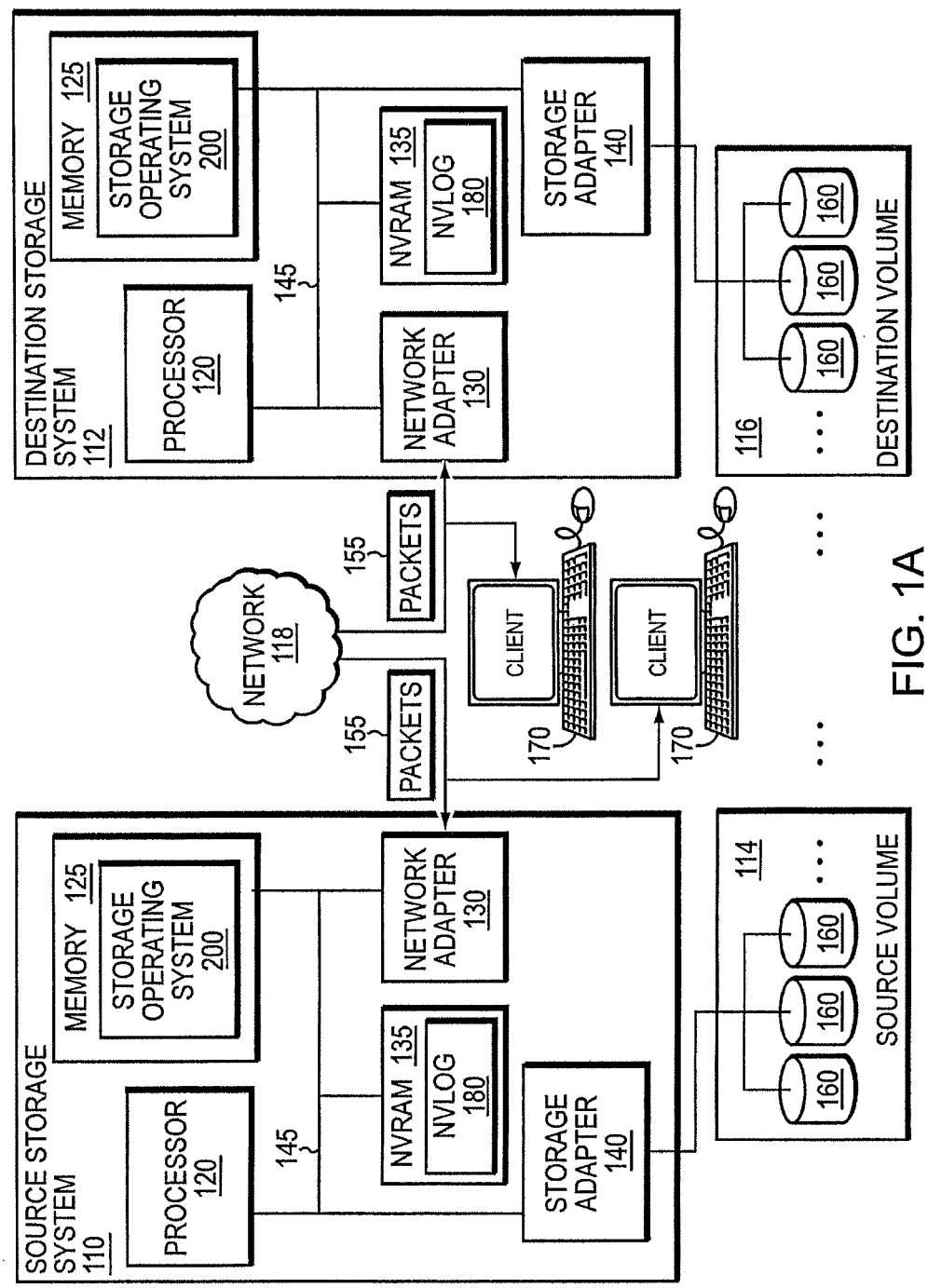
FIG. 1A shows network environment that includes a source network device and a destination network device that communicate with each other over a network according to an embodiment of the present invention.

FIG. 1A is a schematic block diagram of storage system environment that includes a pair of interconnected network devices, such as a source network device and a destination network device. The source network device can be a storage system, such as storage system 110 or a client device, such as client 170 (the latter embodiment is described in reference to FIG. 1B). The destination network device can be a destination storage system 112. For purposes of this description, the source storage system 110 is a device that manages storage of one or more source volumes 114, each having an array of storage devices 160 (described further below). The destination storage system 112 manages one or more destination volumes 116, which, in turn, comprise arrays of devices 160. The source and destination storage systems (e.g., systems 110 and 112) are connected via a network 118 that can comprise a local or wide area network. For the purposes of this description, like components in each of the source and destination storage system, 110 and 112, respectively, are described with like reference numerals. As used herein, the term "source" can be broadly defined as a location from which data travels and the term "destination" can be defined as the location to which the data travels. Both source storage system and destination storage system are multiprocessing systems.

To improve reliability and facilitate disaster recovery in the event of a failure of a storage system, its associated devices or some portion of the storage infrastructure, source storage system 110 and destination storage system 112 may execute a replication application (shown in FIG. 2) configured to replicate some or all of the underlying data and/or the file system that organizes the data. Such an application that establishes and maintains minor relationship between a source storage system and a destination system and provides infinite updates to the destination storage system can be SnapMirror®, a product provided by Network Appliance, Inc., Sunnyvale, Calif. Currently, when a component of a replication application executed at the source storage system 110 establishes a connection with a component of a replication application at the destination storage system 112 to transfer data packets over the network, the replication application at the destination storage system 112 has no control how data packets are going to be processed. Thus, packets that belong to the same session, but to different connections, might be processed by different network threads. Instead, these packets are being reassembled after being processed by different network threads. This, in turn, slows down the performance of the computer systems that processes the received packets.

According to an embodiment of the present invention, a mechanism is provided that enables applications to choose a network thread for processing data packets received on a particular connection. More specifically, as will be described in more detail herein, applications can pre-assign its connections to particular network contexts so that data packets that belong to the same session yet to different connections are processed by the same network thread. A network context data structure includes work items to be processed. A work item includes description of work that needs to be done by a thread. A work item generally includes data packets that have to be processed and a function pointer that needs to be executed with the packets.

Furthermore, the present invention provides capability to migrate connections (and data packets that arrive on the connections) to another network context. Moreover, the present invention, enables applications to use more than one function (such as a hash function), rather than one default hash function, to distribute data packets among various network threads. This increases throughput of a multiprocessing network device.

Still referring to FIG. 1A, she source and destination storage systems 110, 112 each comprise a plurality of processors 120, a memory 125, a network adapter 130 and a storage adapter 140 interconnected by a system bus 145. Each storage system 110, 112 also includes a storage operating system 200 (shown in more detail in FIG. 2) that implements, for example, a file system to logically organize the information as a hierarchical structure of directories and files on devices.

It will be understood by those skilled in the art that the inventive techniques described herein may apply to any type of special-purpose computer or general-purpose computer, including a standalone computer, embodied as a storage system. Moreover, the teachings of this invention can be adapted to a variety of storage system architectures including, but not limited to, a network-attached storage environment, a storage area network, and disk assembly directly-attached to a client/host computer. The term "storage system" should, therefore, be taken broadly to include such arrangements.

In the illustrative embodiment, the memory 125 comprises storage locations that are addressable by the processors and adapters for storing software program code. The memory 125 can be a random access memory (RAM). The processor and adapters may, in turn, comprise processing elements and/or logic circuitry configured to execute the software code and manipulate the data structures stored in memory. The operating system 200 (shown in more detail in FIG. 2), portions of which are typically resident in memory, functionally organizes the storage system by, inter alia, invoking storage operations in support of a file service implemented by the storage system. It will be apparent to those skilled in the art that other processing and memory means, including various computer readable media, may be used for storing and executing program instructions pertaining to the inventive technique described herein.

The network adapter 130 comprises the mechanical, electrical and signaling circuitry needed to connect each storage system 110, 112 to the network 118, which may comprise a point-to-point connection or a shared medium, such as a local area network.

The storage adapter 140 cooperates with the operating system 200 executing on the storage system to access information requested by the client (such as client 170). The information may be stored on the devices 160 that are attached, via the storage adapter 140 to each storage system 110, 112 or other node of a storage system as defined herein.

In one exemplary implementation, each storage system 110, 112 can include a nonvolatile random access memory (NVRAM) 135 that provides fault-tolerant backup of data, enabling the integrity of storage system transactions to survive a service interruption based upon a power failure, or other fault. The size of the NVRAM depends in part upon its implementation and function in the storage system. It is typically sized sufficiently to log a certain time-based chunk of transactions.

Figure 1B:
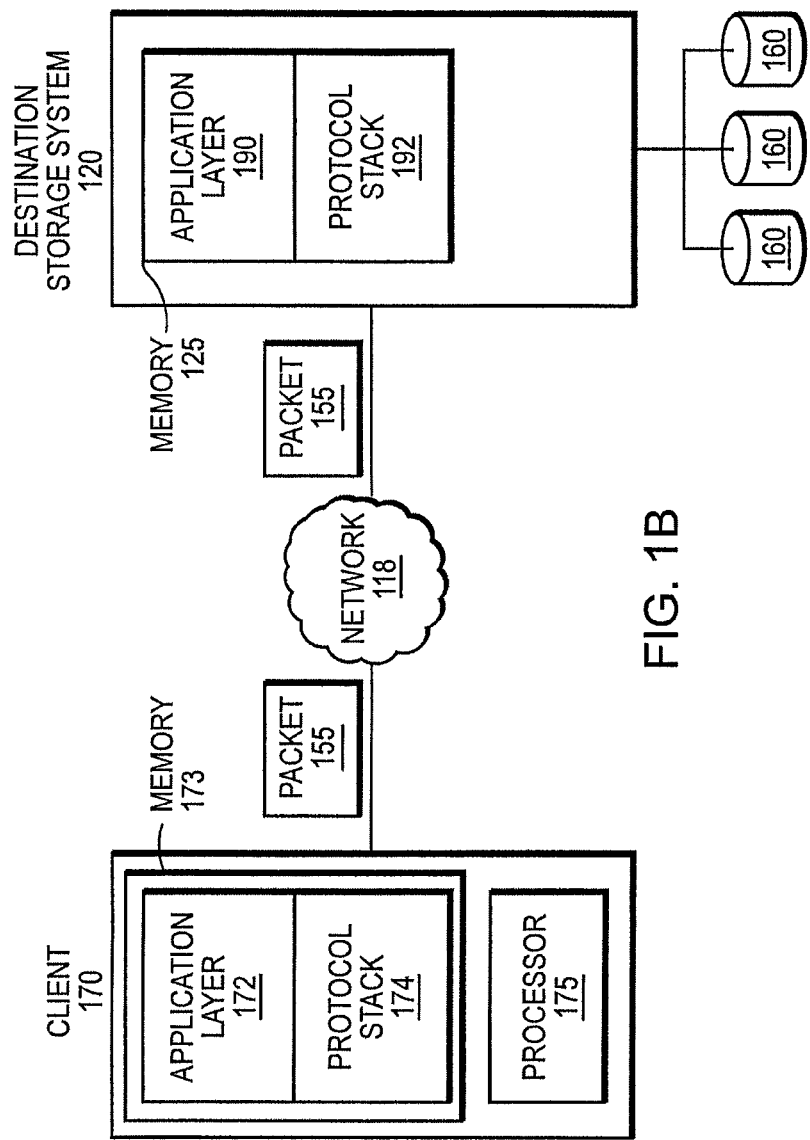
FIG. 1B is a diagram showing a client device in communication with a server network device of FIG. 1.

Referring now to FIG. 1B, it illustrates client 170 in communication with storage device, such as destination storage system 112, over network 118. Although one client 170 is shown in FIG. 1B, those skilled in the art would understand that any number of clients can communicate with storage system 112 over network 118. The client 170 transmits requests for data to the destination storage system 112 and receives responses to the requests over network 118. Data is transferred between the client 170 and the storage system 112 using data packets 155. If the client 170 executes the Windows operating system (not shown in FIG. 1B), data packets can be transmitted using the Common Internet File System (CIFS) protocol over TCP/IP. On the other hand, if client 170 runs the UNIX operating system, it may communicate with the storage system 112 using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that client systems running other types of operating systems may also communicate with the storage system using other file access protocols.

As shown in FIG. 1B, client 170 includes an application layer, which can include software 172 (such as CIFS client software, NFS client software, DAFS client software, or any other application resident in memory 173 and executed by processor 175 on a client 170). Client 170 further includes a protocol stack 174, which may include TCP/IP protocol stack (Internet Protocol layer and its supporting transport mechanisms, the Transport Control Protocol layer and the User Datagram Protocol layer).

Similarly, destination storage system 112 includes an application layer 190, which may include a file system protocol server software (e.g., CIFS server, NFS server, DAFS server, etc). Destination storage system 112 further includes, among other layers, a protocol stack 192, which includes an Internet Protocol layer and its supporting transport mechanisms, the Transport Control Protocol layer and the User Datagram Protocol layer.

Data Packets

Figure 4:
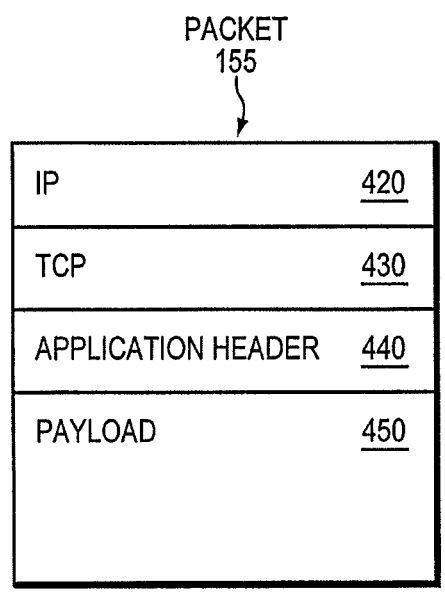
FIG. 4 is a block diagram of components of a data packet transmitted between a source network device and a destination network device shown in FIG. 1.

An exemplary data packet 155 transmitted between client 170 and storage system 112 as well as between storage systems 110 and 112 is shown in FIG. 4. Data packet 155 includes various fields, such as IP header 420, TCP header 430, application header 440, and payload 450.

IP header 420, in turn, includes fields for storing a source IP address (also referred to herein as a "foreign IP address") and a destination IP address (also referred to herein as "a local IP address").

TCP header 430 includes fields for storing a source port (also referred to herein as a "foreign port") and a destination port (also referred to herein as a "local port").

Application header 440 includes control data provided by an application when processing a data packet. If the client 170 executes CIFS client software, the application header 440 stores control information related to CIFS. Similarly, in the case of NFS software, the header stores control information related to NFS. If the application is a replication application executed at the source storage system (such as SnapMirror) and destination storage system, 110 and 112 respectively, than the application header includes control information inserted by the replication application. Payload 450 includes actual data to be stored at the destination storage system 112.

Storage Operating System

Figure 2:
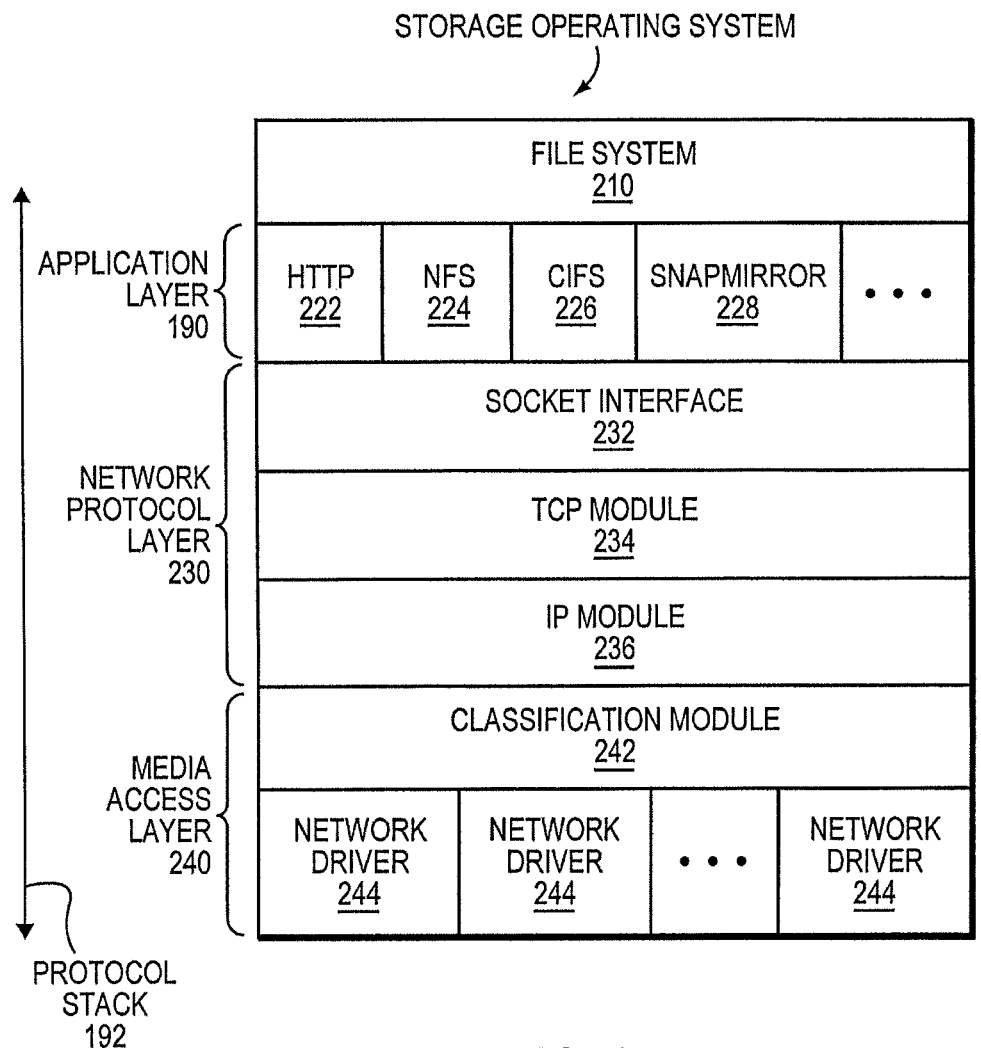
FIG. 2 is a block diagram of components of an operating system of the source network device or destination network device shown in FIG. 1.

FIG. 2 is a schematic block diagram of components of a storage operating system 200 of storage system 110 or 112 that may be advantageously used with embodiments of the present invention. Although some of the components have been described in reference to FIG. 1B, these components will be described in greater detail herein. In the illustrative embodiment, the storage operating system 200 can be the NetApp® Data ONTAP™ operating system available from Network Appliance Inc., of Sunnyvale, Calif., that implements a Write Anywhere File Layout (WAFL™) file system, such as file system 210. However, it is expressly contemplated that any appropriate file system may be enhanced for use in accordance with the inventive principles described herein. As such, where the term "WAFL" is employed, it should be taken broadly to refer to any file system that is otherwise adaptable to the teachings of this invention. As used herein, the term "storage operating system" generally refers to the computer-executable code operable on a computer that manages data access. The storage operating system 200 can be implemented as an application program operating over a general-purpose operating system, such as UNIX® or Windows NT®, or as a general-purpose operating system with configurable functionality, which is configured for storage applications as described herein. The storage operating system 200 further includes a storage device management module (not shown in FIG. 2) that manages access operations to storage devices. The storage device management module may include a module that implements a storage protocol and a driver layer that implements a disk access protocol (these layers are not shown in FIG. 2).

Still referring to FIG. 2, the storage operating system 200 comprises a series of layers (or modules) organized to form an integrated network protocol stack (which was referred to in FIG. 1B as "protocol stack 192") or, more generally, a multi-protocol engine that provides data paths for clients or other storage systems to access information stored on the storage system 110 or 112 using block and file access protocols. The protocol stack 192 includes a media access layer 240 comprising network drivers 244 (e.g., gigabit Ethernet drivers) that interfaces to network protocol layer 230, such as the IP module 236 and its supporting transport mechanisms (e.g., the TCP module 234), as well as a socket interface 232, such as Berkeley Software Distribution (BSD) interface. The media access layer 240 further includes a classifier module 242. The classifier module 242 is responsible for maintaining a pool of network threads and their associated queues (referred to herein as network context). A network thread is a process that executes network functionality.

Application layer 190 may include the CIFS server 226, NFS server 224, the Hypertext Transfer Protocol (HTTP) server 222, SnapMirror application 228, as well as other applications.

Conventional Data Packet Processing

As briefly described in the background section, first a network storage device (such as client 170 or source storage system 110) sends a request to establish connection with a destination network device (such as destination storage device 112). For example, a request may include a source IP address, a source port and a destination port.

NFS client 1 with IP addr1, source port 30000, connects to NFS server at port 2049.

Figure 5:
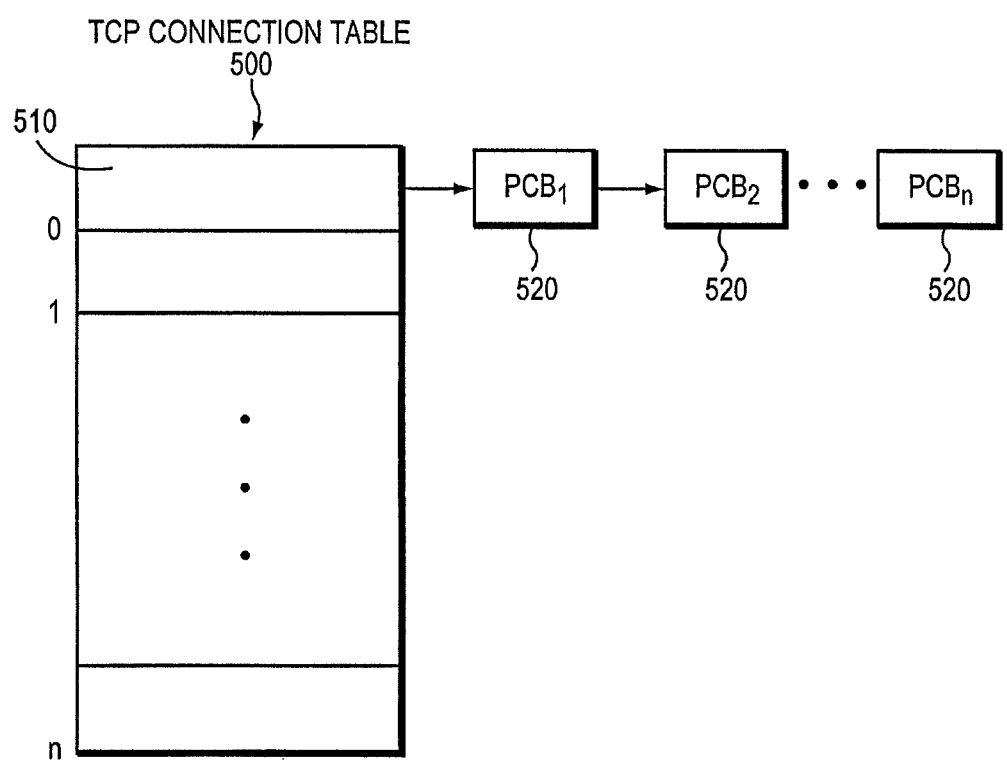
FIG. 5 is an exemplary TCP connection table.

TCP module 234 at destination storage device 112 is responsible for establishing a connection with the source network device. TCP module 234 determines whether information related to this connection already exists. To this end, TCP module 234 uses a TCP table (one such table is shown in FIG. 5). TCP table 500 (also referred to herein as a "hash table") is a data structure that stores information used by TCP module 234 to process data packets. TCP table is established upon initialization of storage system 112 and can be maintained in memory 125. As shown in FIG. 5, TCP table 500 is an array of hash indexes or hash buckets associated with a linked list of PCBs. A PCB stores information related to one network connection. This information may include data related to:

a) establishing a connection (such as sending a connection request from an initiating device to a destination device, receiving an acknowledgement from the destination device, and sending an acknowledgement signal to the destination device), b) managing data transmission (sending data packets between the devices), c) managing data receipt, and d) termination of connection.

To determine whether information related to a new connection already exists, TCP module 234 indexes into a hash bucket using, for example, a value calculated as a hash of a source IP address, a source port, and a destination port of the incoming data packet. TCP module 234 compares a 3-tuple in the incoming packet with information in PCBs. If there is a match (e.g., the PCB block for the requested connection already exists), TCP module 234 uses the information stored in the PCB to manage data transmission for the connection. Otherwise, TCP module 234 creates a new PCB and attaches it to a linked list of PCBs in the TCP table. TCP module 234 populates a new PCB block with the information regarding the initiated connection (such as information related to a) establishing a connection, b) managing data transmission, c) managing data receipt, and d) termination of connection.

After the connection has been established, data packets for the particular connection are received by the network drivers 244. The network drivers 244 execute driver threads to queue the received data packets and call the classifier module 242.

The classifier module 242 receives a data packet, calculates a hash based on a 3-tuple (source IP address, source port, and destination port) indicated in the packet, and uses the calculated value to identify a network context to which queue the data packets arriving on the connection. The following hash function can be used:

Destination port 1: $y=\text{hash1}(x)$;

wherein 'x' is a source IP address of the incoming data packet, source port, and destination port (also referred to herein as a 3-tuple); 'y' represents a hash number, which then becomes an input to another function, which maps the hash to a network context number 'y1' as follows:

$y1=\text{map\_hash\_}q(y)$.

A network thread picks up the packet and performs TCP and IP processing. The TCP module 234 receives the data packet and the network context and determines TCP connection to which the data packet belongs. As was described in the background section, TCP module 234 does so by calculating a hash value based on a 3-tuple (using the same hash function that the classifier module was using). TCP module 234 uses the calculated hash value to index into the TCP hash tables (such as table 500 shown in FIG. 5) to obtain PCB corresponding to the connection. Thus, as described herein, conventionally, the classifier module 242 and the TCP module 234 shared the same hash function to perform processing.

Although sharing the same hash function by the TCP module and the classifier module 242 avoids locking data structures that stores TCP connections, such a mechanism limits ability of the applications to flexibly distribute connections.

Custom Hash Algorithms

Figure 11:
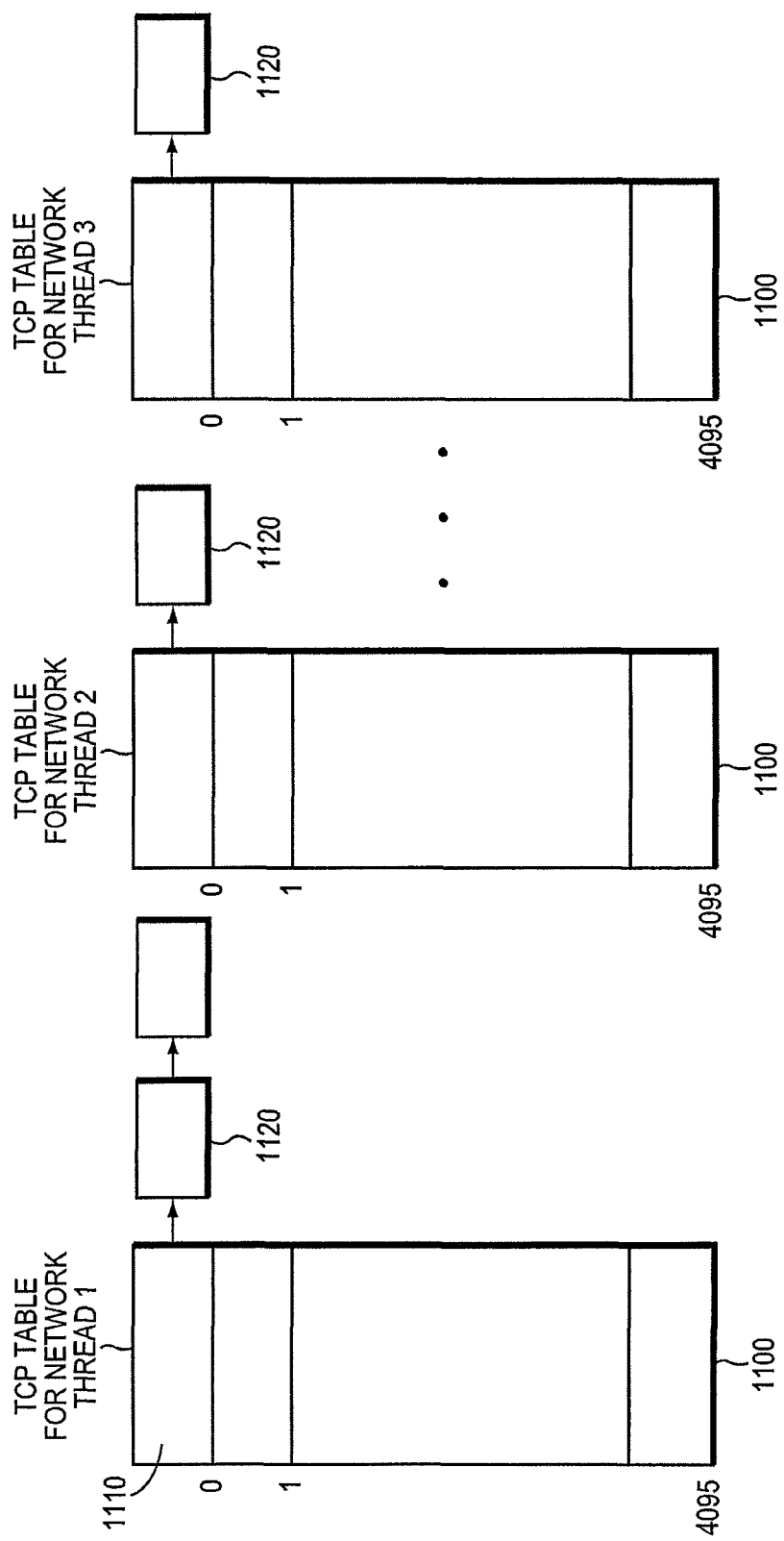
FIG. 11 is a diagram showing a plurality of TCP connection tables, each table corresponding to a network context according to an embodiment of the present invention.

According to an embodiment of the present invention, rather than having one TCP table that is accessed by all network threads, each network thread is associated with its own TCP table that stores TCP connections queued to that thread. As a result, no other thread can access that table. Referring now to FIG. 11, each table 1100 is associated with its own network thread so that the network thread accesses its own TCP data structure during execution. Each table 1100 includes hash buckets 1110 corresponding to a linked list of portable control blocks (PCBs) 1120. Each PCB 1120 stores information related to a network connection.

Since each network thread accesses its own TCP table, rather than accessing one table shared by all network threads, the present invention eliminates the need to segment the TCP table or to lock the table to prevent multiple threads from accessing the same data structure. As a result, the network thread can use any algorithm (i.e., a hash function) that can be distinctly different from the classifier's hashing algorithm to look up a TCP connection.

Since TCP module 234 and classifier module 242 no longer need to share the same hash function, according to one embodiment, the classifier module 242 can use different hash functions provided by the application, rather than a default one, to distribute connections among various network contexts. When classifier module 242 picks up a data packet from network drivers 244, the classifier module 242 calculates a hash index of 'y' (using a 3-tuple) and maps 'y' to 'y1' to identify a network context on which to send the data packet as follows:

destination port 1: $y=\text{hash1}(x)$, network thread $y1=\text{map\_hash\_}q(y)$ destination port 2: $y=\text{hash2}(x)$, $y1=\text{map\_hash\_}q(y)$ source port 3: $y1=\text{hash3}(x)$, $y1=\text{map\_hash\_}q(y)$ source port 4: $y1=\text{hash4}(x)$, $y1=\text{map\_hash\_}q(y)$ As indicated in this example, classifier module 242 can use different hash functions to distribute data packets that belong to an application (e.g., CIFS, NFS, etc). Since different hash functions are used, 'y' is different for a given 'x'. As a result, TCP connections for one application are mapped to a different network thread 'y1' so that they can be distributed over different network contexts (and thus their associated network threads). As a result, according to this novel implementation, TCP connections of a particular application are better load balanced in a multiprocessing system. This novel mechanism can be contrasted with prior art implementations in which load balancing was achieved by using the default hash algorithm for all TCP connections in general and did not differentiate between TCP connections of one application and another application. As a result, connections of a particular application were not load balanced.

Figure 3:
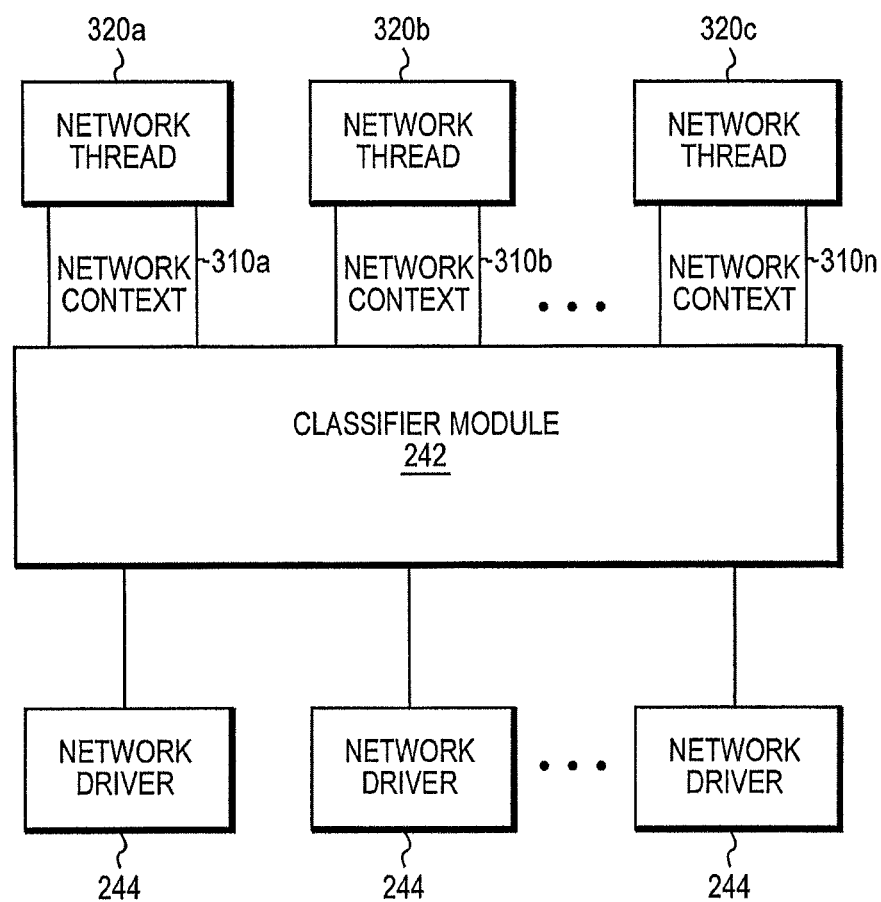
FIG. 3 is a more detailed diagram of components of the destination network device shown in FIG. 1A and FIG. 1B according to an embodiment of the present invention.

Referring now to FIG. 3, it shows network drivers 244 executing driver threads 246, network contexts 310a, 310b, and 310n, each belonging to its corresponding network thread (320a, 320b, and 320n), and classifier module 242. A network thread works on multiple connections that are associated to each other in a network context. The network thread that is processing connections queued to a particular network context picks up the packet and initiates the processing. Packets queued to network context 310a are processed by network thread 320a, packets queued to network context 310b are processed by network thread 320b, and packets queued into network context 310c are processed by network thread 320c.

Pre-Assignment of Connections and Migrating of Connections

According to another embodiment of the present invention, applications can pre-assign connections to a particular network context so that data packets arriving on those connections will be queued to a pre-assigned network context. Furthermore, applications can migrate connections to another network context after the connection has been queued to a network context and to send data over the connection at any point in the lifetime of the connections. An interface for preassigning connections to a network context as well as an interface for migrating of connections to another different context are provided.

Figure 6:
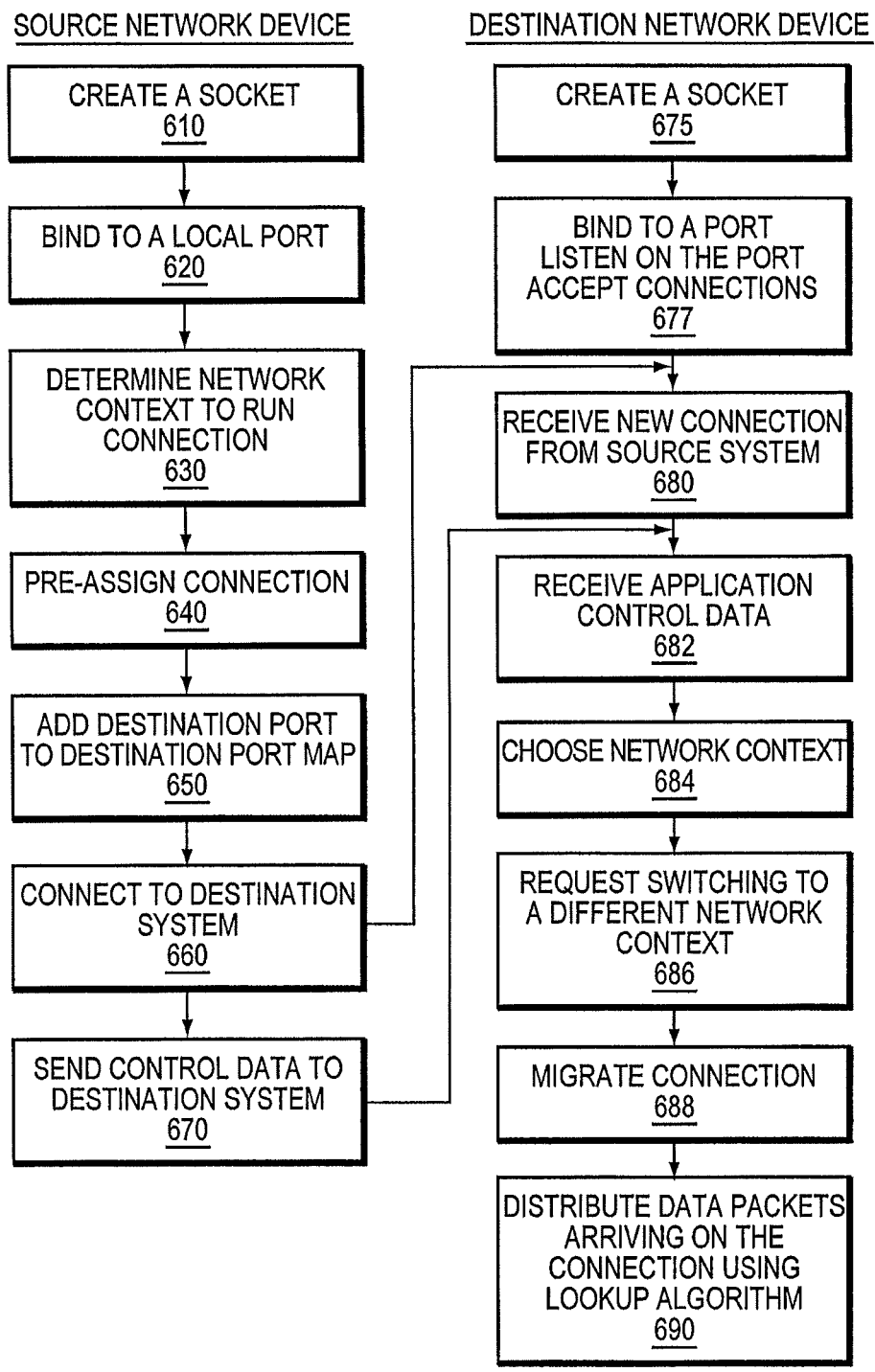
FIG. 6 is an event diagram of communications between the source network device and the destination network device (shown in FIG. 1A) to pre-assign network connections to a network context and to migrate existing network connections to another network context according to embodiments of the present invention.

Referring now to FIG. 6, it shows communications between the source network device (such as a client 170 or a source storage system 110) and a destination network device, such as destination storage system 112, to pre-assign network connections to a network context as well as to migrate existing connections to other network contexts.

Source Network Device

Initially, at step 610, an application (such as CIFS, NFS, SnapMirror, etc) at the source network device creates a socket (e.g., a combination of an IP address and a port used as an endpoint for sending and receiving data between network devices). This involves providing an identifier that the application uses to uniquely identify an endpoint of communication.

At step 620, the application binds to a source port and listens on that port. For example, in the case of a data replication application (such as, for example, SnapMirror provided by Network Appliance, Inc. of Sunnyvale, Calif.), the replication application executed at the source network device binds to a source port 32000. In this example, the application asks TCP module to provide a port number. The TCP module will then assign a port number. The application wants to establish connection with a particular destination port. According to an embodiment of the present invention, prior to establishing connection with a destination port, the application may pre-assign the connection (step 640) to a particular network context to which data packets arriving on that connection will be queued. To this end, the network protocol layer provides an application programming interface (API) to classifier module 242 at the source network device indicating to which network context the connection should be assigned. Also, the PCB block that stores information about the connection is added to a TCP table corresponding to the network context to which the application chooses to pre-assign its connection. As shown in FIG. 11, each network context has a corresponding TCP table (such as table 1100) storing TCP connections for that network context. Information about a TCP connection is stored in a PCB block.

Figure 8:
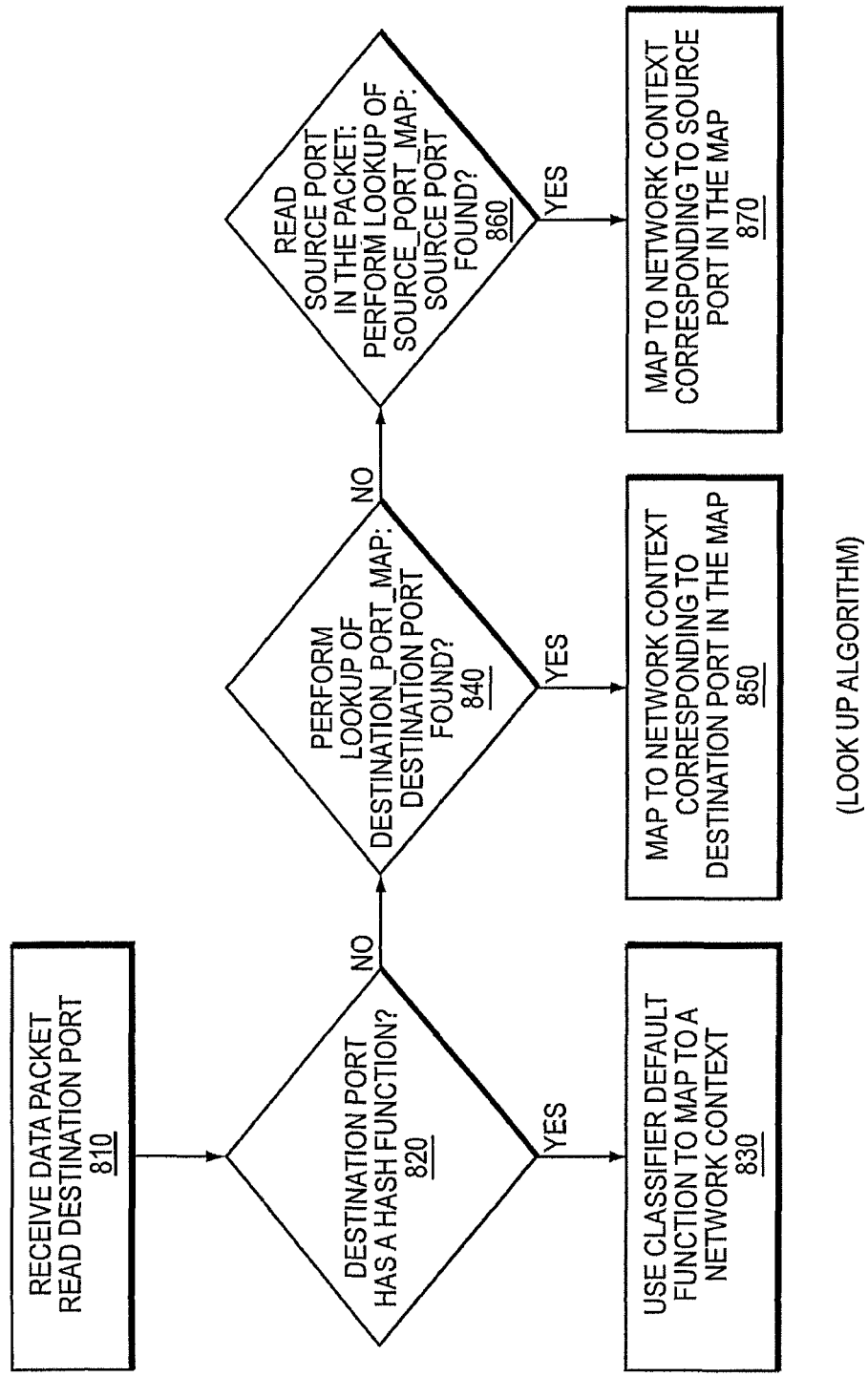
FIG. 8 is a diagram of the steps to execute a look up algorithm to determine how to process data packets arriving on a connection according to embodiments of the present invention.
Figure 9:
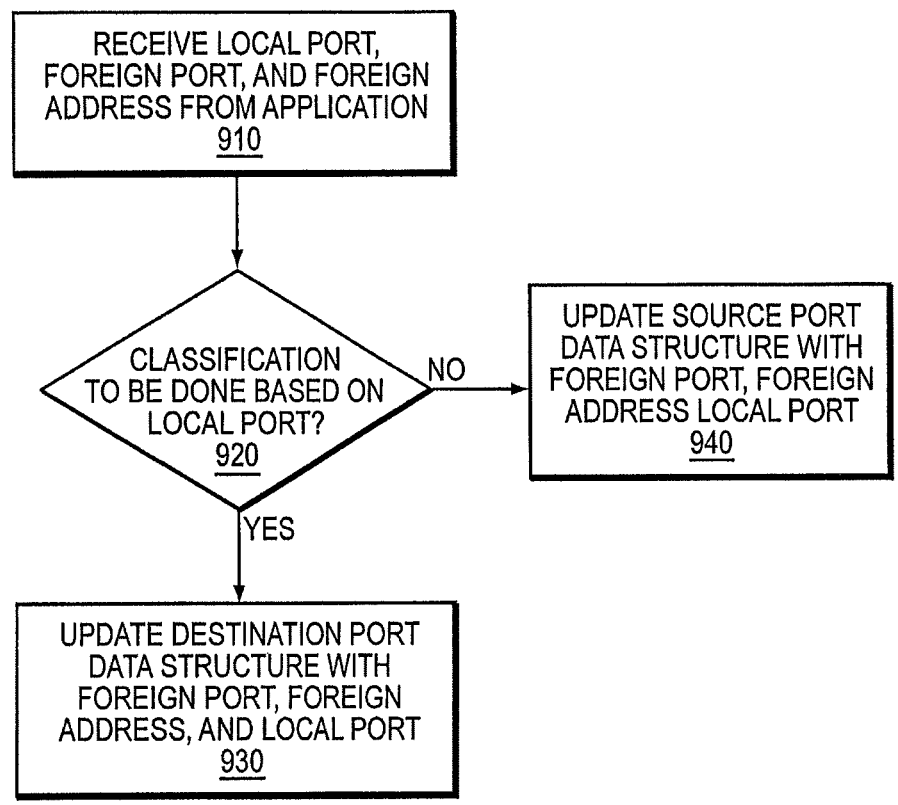
FIG. 9 is a diagram of the steps to perform pre-assignment of connections to a particular network context according to an embodiment of the present invention.
Figure 10:
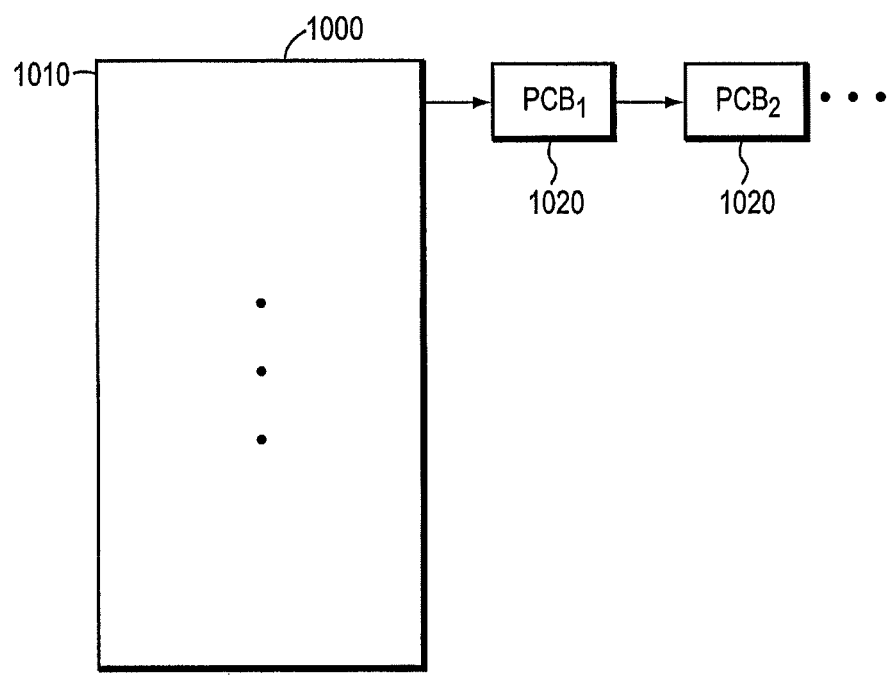
FIG. 10 is an exemplary a source_port_map data structure according to an embodiment of the present invention.

Referring now to FIG. 9, it illustrates more detailed steps performed by an application to pre-assign a connection to a particular network context. At step 910, an application may provide the following parameters—foreign (source) address, foreign (source) port, and local (destination) port that it will use to create the connection. The application also provides in the API whether the packet classification at the source network device will be done on the basis of the destination port or the source port (step 920). According to an embodiment of the present invention, classification module 242 at the source network device creates the following data structures: source_port_map and destination_port_map. Those skilled in the art would understand that any data structure can be used for storing source and destination ports, and the invention is not limited to using the map. An exemplary source_port_map 1000 is shown in FIG. 10. Data structure 1000 includes a plurality of hash buckets 1010 linked to a hash list of portable control blocks (PCB) 1020. Each PCB stores information about a particular connection. A lookup of the source_port_map is performed based on the source port indicated in the packet. Destination_port_map (not shown in FIGS. 1-12) also includes a plurality of hash buckets linked to a hash list of PCBs. A lookup of the destination_port_map is performed based on the destination port indicated in the packet.

If the classification (queuing data packets arriving on the connection to a network context) will be done based on the destination port, the destination_port_map data structure is updated with the 3-tuple for the connection (source port, source address, and destination port) (step 930). If the classification will be done based on the source port, source_port_map data structure is updated with the 3-tuple (step 960). These data structures are used later by classifier module 242 at the source network device to queue data packets arriving on the connection to the pre-assigned network context. Thus, embodiments of the present invention enable applications to pre-assign connections to a particular network context at the source network device. To this end, an application uses an API to instruct the classifier module 242 to assign the connection to a particular network context prior to sending a data packet on a connection to a destination network device. This gives applications flexibility to distribute connections in a multiprocessing system. As a result, connections that belong to the same application are better distributed in the multiprocessing system.

Referring again to FIG. 6, at step 660, the application (such as NFS client, CIFS client, or a replication application) at the source network device connects to the application (such as NFS server, CIFS server, replication application) at the destination network device. For example, in the case of a replication application:
SnapMirror source with IP address 1, source port 32000, connects to SnapMirror destination port 30000.

The application sends to the destination network device control data in the form of a data packet, which includes information about the connection and the session.

Destination Network Device

Prior to receiving a new connection from the source network device, the application at destination network device creates a socket (step 675), binds to a port, listens on the port, and accepts connections on the port (step 677).

Network drivers 244 receive, from the source network device, the data packet (steps 680-682), which includes application control data. The classifier module 242 chooses a network context to distribute the connection. In one implementation, the classifier module 242 may use a default hash algorithm to choose a network context. To this end, in one implementation, it computes a hash function based on a source address, source port, and destination port as follows:

$$\text{Destination port 1: } y=\text{hash}(x), y1=\text{map\_hash}\_q(y)$$

According to another embodiment of the present invention, classifier module 242 may use a custom hash algorithm to calculate a network context as follows:

$$\text{Destination port 1: } y=\text{hash1}(x), \text{ network thread}$$
$$y1=\text{map\_hash}\_q(y)$$

The network threads then perform IP and TCP processing of the data packet.

Migration of Connections

At some point, an application may decide that it wants to move its connection to a different network context. For example, the application decides that connections that belong to the same session should be queued to the same network context and thus processed by the same network thread. Conventionally, when one thread is processing data packets that belong to one connection, it is complex to process the data packets by another network thread. Moving the connection to another network thread may put the connection in an inconsistent state. That is, data structures and the values they contain will be inconsistent or corrupted. For example, each TCP connection maintains multiple timers that are used to send delayed acknowledgements and data retransmissions. In prior art implementations, all TCP timers are processed by a single thread called the "TCP timer thread" or "TCP callout thread." Migrating a connection in prior art implementations would require halting execution of the TCP timer thread. This, in turn, would halt execution of timer threads for all the connections. According to embodiments of the present invention, a connection's state (data structures and values that they contain) are moved from one network thread to another network thread without putting the connection in an inconsistent state. This is accomplished by blocking all processing of data packets on the connection to be migrated until the migration is complete.

Figure 7:
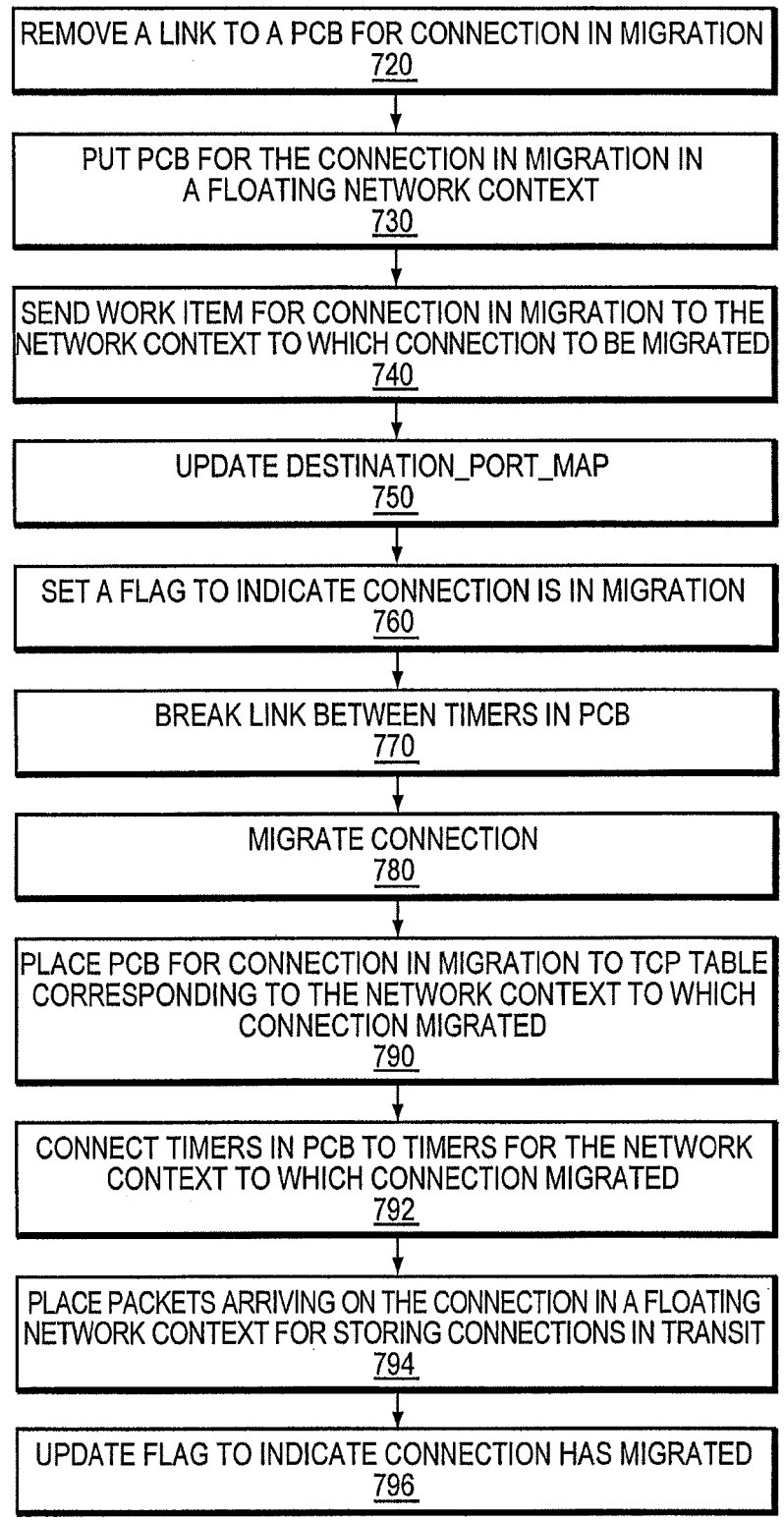
FIG. 7 is a detailed diagram of the steps to migrate network connections to another network context.

Still referring to FIG. 6, an application calls an API to classifier module 242 to switch to a different network context (step 686) (e.g., to migrate a connection). When the application decides that it wants to move the connection to a different network context, the connection's assignment to its current network context is terminated and it has to be re-assigned to a different network context as described herein. FIG. 7 illustrates steps performed by classifier module 242 to migrate a connection from one network context to another network context.

Referring now to FIG. 7, to migrate the connection, a link to a PCB for the connection in migration is removed in a TCP table corresponding to the network context from which the connection is removed (step 720). As described herein, each network context is associated with its own TCP table 1100. Each table 1100 is associated with one network context and is accessed by a particular network thread. Each table includes a plurality of hash buckets connected to a linked list of PCBs. Another data structure referred to herein as a "floating network context queue" is a temporary queue for storing data packets arriving on a connection to be migrated (the floating data structure is not shown in FIGS. 1-11). Since each network thread (and its associated network context) has its own TCP table, embodiments of the present invention make migration of connections easier by simply removing a link to a PCB block for the connection in migration in a PCT table corresponding to the network context from which the connection is migrated. The floating network context queue is updated with the PCB block corresponding to the connection in migration (step 730). At step 740, the work item for the connection in migration is sent to the network context to which the connection is migrating, thereby queuing the work item to the new network context. As previously described, a work item includes description of work that needs to be done by a thread. A work item generally includes data packets that have to be processed and a function pointer that needs to be executed with the packets.

At step 750, a data structure, such as a destination_port_map, is created at the destination network device and updated with a 3-tuple-source address, source port, and destination port. In addition, the network context is also provided by the application and is stored in the PCB. Thus, a PCB that corresponds to the connection stores, among other parameters, a source address, source port, destination port, and the network context to which the connection is migrated. At step 760, a flag is set in PCB for the migrating connection to indicate that the connection is in migration.

At step 770, links to timers from the PCB block for the connection in migration are removed.

At step 780, the network thread wakes up, picks the work item from the network context to which the connection was initially queued. The network thread calls a function (such as migrate_connection) to migrate the connection.

The function picks up the PCB from the network context to which the connection was originally queued and adds the PCB to the TCP table corresponding to the network context to which the connection is migrated (step 790). Then the PCB for the migrated connection is connected to the timers corresponding to the network context to which the connection is migrated (step 792).

When a packet arrives on the connection in migration and the flag indicates that the connection is still in migration, the classifier module 242 puts the packet to the floating network context queue (step 794). The flag is then updated to indicate that the connection is migrated (step 796).

Thus, creating TCP tables for each network context (and for each network thread) makes migration of connections easier (as compared to prior art implementations). When one TCP table was shared by all network threads, migration of connections was not feasible for the following reasons. When one TCP table was accessed by all network threads, one hash bucket/hash index was accessed only by one network thread. Since each TCP connection has one unique 3-tuple, which always computes to a unique hash value when the hash function operates on it, moving PCBs from one hash index to another hash index was not feasible.

Furthermore, in prior art implementations, all TCP timers are processed by a single thread called the "TCP timer thread" or "TCP callout thread." To migrate a connection in prior art would require halting execution of the TCP timer thread. According to an embodiment of the present invention, TCP timers are spread across different network threads and processed by the same thread that does other TCP processing. That is, the network thread that does the packet processing of one TCP connection also does the timer processing of that connection. As a result, when a network thread that owns that connection migrates the connection to another network thread, it makes a lot easier to remove a PCB for that connection as well as the TCP timers, place the PCB and the TCP timers in the floating network context queue, and then put the PCB and the TCP timers for the connection to a TCP table of another thread where the connection is migrated. This novel mechanism provides for migration of the connections any number of times in a lifetime of a connection.

Processing Data Packets Using Lookup Algorithm

After the connection is migrated to another network context, when a classifier module 242 receives data packets that arrive on the migrated connection, it queues the data packets to the network context using a look up algorithm, which is described in greater details in reference to FIG. 8.

Referring now to FIG. 8, at step 810, when a data packet is received, classifier module 242 checks a destination port in the data packet. Classifier module 242 determines whether the destination port has a hash function associated with it (step 820). If so, that hash function is used to queue the incoming data packet to a network context (step 830), as follows:

> Destination port 1: $y=\text{hash1}(x)$, $y1=\text{map\_hash\_}q(y)$,
> wherein '$x$' represents a 3-tuple.

If the destination port does not have a default function associated with it, classifier module 242 looks up the destination_port_map to find the destination port in the map (step 840). If the destination port is found, classifier module 242 obtains a network context from an entry corresponding to the destination port in the destination_port_map data structure (step 850) (as was described herein, at some point during the process of migrating of the connection, destination_port_map is created at the destination network device and updated with a 3-tuple-source address, source port, and destination port. In addition, the network context is also provided by the application and is stored in the PCB. Thus, a PCB that corresponds to the connection stores, among other parameters, a source address, source port, destination port, and the network context to which the connection is migrated). Thus, the destination_port_map stores the destination port and the network context to which the connection is migrated. Classifier module 242 then queues the arrived data packet to that network context.

If the destination port is not found in a data structures, such as destination_port_map, classifier module 242 reads a source port in the incoming data packet and performs a look up of the source_port_map (step 860). If the source port is found in the data structure, classifier module 242 reads a network context corresponding to the source port in the data structure (step 870).

If the source port is not found in a data structure, such as the source_port_map, classifier module 242 uses its lookup functions to identify other hash functions corresponding to the source port (step 880).

If no hash functions are found, it might be indicative that the packet is not a TCP packet corresponding to an application that uses the network thread model. As a result, the packet will be queued to a network thread, such as for example, the $0^{th}$ network thread, that services all applications that do not support the network thread model.

TCP module 234 then picks up the packet and the network context, processes the packet, and sends the packet off to the IP module 236. The IP module 236, in turn, validates the packet, and sends it off to the TCP module 234. TCP module 234 uses a function to call into application layer 190. Layer 190, in turn, allocates a data structure in memory for a data packet and populates the data structure with a protocol header (such as NFS header, CIFS header, etc). If the data packet is a read request, destination storage system 112 looks up its memory 125 for data. If the data is not in the memory 125, the packet goes to the file system 210, which in turn, requests a storage device management module (not shown in Figs.) to satisfy the request. The application layer 190 receives the data, assembles a packet, and inserts a protocol header.

TCP module 234 receives the packet, adds a TCP header, and hands off the packet to IP module 236. IP module 236 looks at the destination address in the data packet and sends the data packet to an appropriate network driver. The network driver 244 transmits the packet over the network 118 to the source network device (such as a client 170 or a source storage system 110).

Thus, embodiments of the present invention advantageously enable applications to have control over assignment of network connections to a particular network context. An application may want to pre-assign a connection to a network context. Furthermore, an application can migrate the connection to another network context after the connection has been established and send data packets over that connection at any point during the lifetime of the connection. A particular connection can be migrated multiple times during the lifetime of the connection.

Furthermore, rather than maintaining one TCP table accessed by all network threads, each network thread is associated with its own TCP table that stores information about connections assigned to the network thread for processing. Since no other thread can access the TCP table associated with a particular network thread, each network thread can use a hash function different from the one used by a classifier module to distribute connections to different network contexts. By having each network thread associated with its own TCP table, the present invention eliminates the need to segment the TCP hash table or to lock the hash table to prevent multiple threads from accessing the same data structure. Moreover, creating TCP tables for each network context (and thus for each network thread) makes migration of connections a lot easier since a PCB corresponding to a connection in migration can be easily moved from a TCP table that stores information about that connection to another TCP table that stores connections for a network context where the connection is migrated. Importantly, embodiments of the present invention halt processing of all data packets on the connection until the migration is completed.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims. For example, although various embodiments are described in the context of the TCP, those skilled in the art would understand that any protocol for transmitting packets over a network can be employed (such as UDP, HTTP, etc). Furthermore, those of skill in the art would understand that although embodiments of the present invention were described in the context of using hash functions, any other suitable method for turning data into another number can be used with the present invention.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by apparatuses for performing the operations herein. These apparatuses may be specially constructed for the required purposes or they may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method comprising:
halting processing of data packets arriving on an established network connection until the connection is migrated to a new network context that queues connections processed by a network thread without putting the connection in an inconsistent state;
migrating the connection to the new network thread;
removing a link to a portable control block (PCB) storing information about the connection in migration from a first data structure corresponding to the network thread from which the connection will be migrated to a temporary queue; and
placing the PCB to a new data structure corresponding to a new network thread to which the connection is migrated.

2. The method of claim 1, wherein migration of the connection to the new network thread is performed without halting execution of timer threads.

3. The method of claim 1, further comprising:
maintaining a plurality of timer data structures accessed by network threads;
removing a timer data structure corresponding to a connection in migration from the first data structure;
placing the removed timer data structure to a temporary queue; and
placing the timer data structure to the new data structure corresponding to a new network thread to which the connection is migrated after the connection is migrated.

4. The method of claim 1, further comprising:
placing data packets arriving on the connection in migration in a temporary queue;
placing the data packets into the new data structure for the migrated connection after the connection is migrated.

5. The method of claim 1, further comprising:
updating a destination port data structure with a source address, source port, and destination port and a network context to which the connection is migrated;
receiving a data packet on a network connection migrated to a new network context;
identifying a destination port from the data packet; and
responsive to the destination port having an algorithm associated with it, queuing up the data packet to a network context determined using the algorithm.

6. The method of claim 1, further comprising:
updating a destination port data structure with a source address, source port, destination port and a network context to which the connection is migrated;
updating a source port data structure with a source address, source port, destination port and a network context to which the connection is migrated;
receiving a data packet on a network connection migrated to a new network context;
identifying a destination port from the data packet;
responsive to the destination port not having an algorithm associated with it, using the destination port as an index to perform a look up of a destination port data structure to identify a network context associated with the destination port; and
queuing the data packet to the network context.

7. The method of claim 6, further comprising:
responsive to not finding the destination port in the destination port data structure:
identifying a source port in the data packet, and using the source port as an index to perform a look up of a source port data structure to identify a network context associated with the source port; and
queuing the data packet to the identified network context.

8. A computer-readable device having stored thereon instructions for performing a method for enabling applications to flexibly distribute data packets in a multiprocessing system, the method comprising machine executable code which when executed by at least one machine, causes the machine to:
halt processing of data packets arriving on an established network connection until the connection is migrated to a new network context that queues connections processed by a network thread without putting the connection in an inconsistent state;
migrate the connection to the new network thread;
remove a link to a portable control block (PCB) storing information about the connection in migration from a first data structure corresponding to the network thread from which the connection will be migrated to a temporary queue; and
place the PCB to a new data structure corresponding to a new network thread to which the connection is migrated.

9. The method of claim 1, further comprising:
maintaining a plurality of connection data structures, each data structure associated with a network thread executed in the multiprocessing system, each data structure storing connections queued to a network thread.

10. The method of claim 9, further comprising:
receiving an indication that an application wants to migrate the established network connection to the new network context that queues connections processed by the network thread.

11. The computer-readable device of claim 8, wherein the method comprising machine executable code which when executed by at least one machine, causes the machine to:
maintain a plurality of connection data structures, each data structure associated with a network thread executed in the multiprocessing system, each data structure storing connections queued to a network thread.

12. The computer-readable device of claim 11, wherein the method comprising machine executable code which when executed by at least one machine, causes the machine to:
receiving an indication that an application wants to migrate the established network connection to the new network context that queues connections processed by the network thread.

* * * * *